Nov. 4, 1958
G. W. HARRIS ET AL
2,858,896
AUTOMATIC CLUTCH THROW-OUT DEVICE
Filed Aug. 10, 1955
2 Sheets-Sheet 1
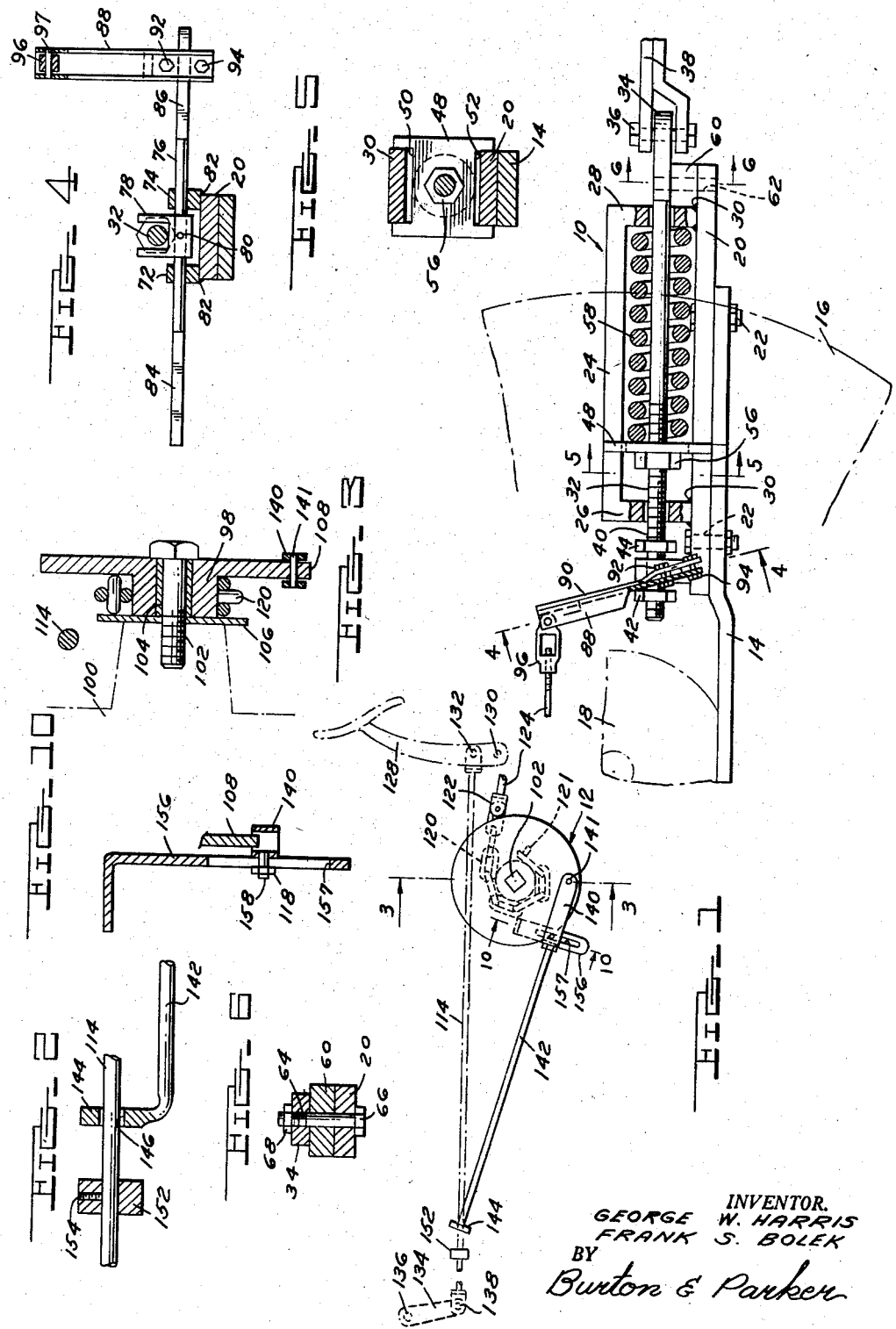
INVENTOR.
GEORGE W. HARRIS
FRANK S. BOLEK
BY
Burton & Parker
ATTORNEYS

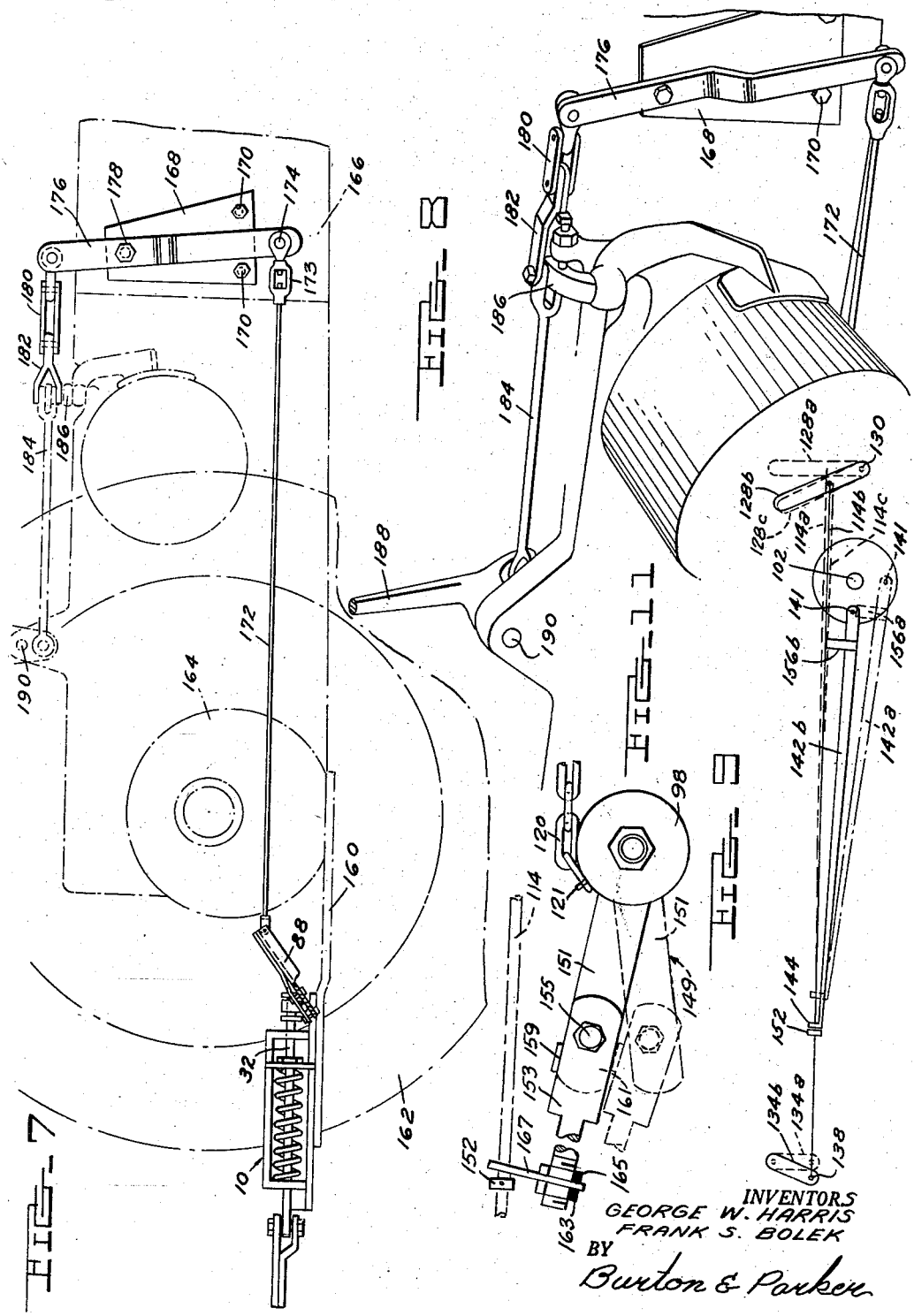

United States Patent Office 2,858,896
Patented Nov. 4, 1958

2,858,896
AUTOMATIC CLUTCH THROW-OUT DEVICE
George W. Harris and Frank S. Bolek, Perry, Mich.
Application August 10, 1955, Serial No. 527,445
9 Claims. (Cl. 180—14.5)

This invention relates to farm tractors and particularly to a clutch throwout device for the same.

An object of the invention is the provision of a clutch throwout device which is mounted on the tractor drawbar to connect an implement to be towed by the tractor to the drawbar with the device including clutch actuating mechanism and means coupling the mechanism with the tractor clutch operating lever, with the device being adapted, upon excessive resistance to pull of the implement, to actuate the clutch operating lever and thereby cause disengagement of the clutch of the tractor and the resultant uncoupling of the tractor engine from the driving wheels.

Another object of the invention is the provision in a clutch throwout device of the above character, of a spring loaded towing shaft adapted to be coupled with an implement to be towed with the spring loading of the shaft resisting the pull of the implement, and connecting means coupled with the towing shaft and with the clutch mechanism of the tractor and operable upon the movement of the towing shaft against the force of its spring loading when the pull on the implement exceeds a predetermined amount, to disengage the clutch of the tractor.

Another object of the invention is the provision in a clutch throwout device of an adjustably spring tensioned actuating mechanism adapted to be mounted on the towbar of the tractor and connected to an implement to be pulled by the tractor, and connecting linkage adapted to connect the clutch mechanism of the tractor with said actuating mechanism, which linkage includes a part pivotally mounted on the tractor with the part connected to the clutch mechanism of the tractor on one side of the pivotal axis of the part and connected to said actuating mechanism on the opposite side of the pivotal axis of the part, with said part being pivoted upon its axis, when the pull on the implement exceeds the spring tension in the actuating mechanism, to disengage the clutch of the tractor. A concomitant object of the invention is the provision of connecting linkage of the aforementioned character which is adapted to hold the clutch disengaged even after the pull on the implement is relieved.

Another object of the invention is the provision of a clutch throwout device adapted to be mounted on the drawbar of a tractor and which is of sturdy construction and operable to draw an implement behind the tractor, with the device being capable of functioning either as simply a towing link for the drawbar, or as an automatic device capable of disengaging the tractor clutch from the driving wheels.

This application is a continuation-in-part of our co-pending application Serial No. 474,052 filed December 9, 1954, and now abandoned.

Other objects, advantages, and meritorious features will more fully appear from the specification, claims, and accompanying drawing, wherein:

Fig. 1 is a side view of our device mounted on a schematic representation of a foot-clutch operated tractor;

Fig. 2 is a detailed sectional view through the left hand end of Fig. 1;

Fig. 3 is a cross sectional view taken on the line 3—3 of Fig. 1;

Fig. 4 is a cross sectional view taken on the line 4—4 of Fig. 1;

Fig. 5 is a cross sectional view taken on the line 5—5 of Fig. 1;

Fig. 6 is a cross sectional view taken on the line 6—6 of Fig. 1;

Fig. 7 is a side view of another form of connecting linkage mounted on a hand clutch operated tractor;

Fig. 8 is a top perspective view of the mechanism shown in the right hand end of Fig. 7;

Fig. 9 is a schematic view of the operative position of the connecting linkage shown in Fig. 1;

Fig. 10 is a cross sectional view taken on the line 10—10 of Fig. 1; and

Fig. 11 is a modified form of a portion of the connecting linkage shown in Fig. 1.

In carrying out the objects of our invention we have provided, as shown in Fig. 1, a clutch throwout device which includes an actuating mechanism generally indicated at 10 and a connecting linkage generally indicated at 12. The actuating mechanism comprises a pair of relatively movable spring tensioned draft members, hereinafter more particularly described, with the mechanism being adapted to be mounted upon the drawbar 14 of a well known tractor. The right rear wheel 16 of the tractor is shown in the drawing in Fig. 1. The drawbar extends beneath the differential gear housing 18 and is connected in any convenient manner, not shown, to the tractor. The drawbar 14, itself, forms no part of the invention.

The actuating mechanism 10 includes a housing, forming one of the above mentioned draft members, which housing has a base plate or floor member 20 adapted to be secured as by the bolts 22 to the drawbar. Mounted upon the base plate 20 is a top plate 24 having at each end depending end wall portions 26 and 28, forming, respectively, front and rear walls, which are secured to the base plate 20 as by welding or the like 30. The ends of the base plate project beyond the end walls 26 and 28 as shown in Fig. 1.

The end walls 26 and 28 are bored to receive the second of the above mentioned draft members which comprises the spring loaded towing shaft 32 extending through the walls 26 and 28. The towing shaft 32 is flatted at one end as at 34 and apertured to receive the pin or bolt 36 of the towbar 38 of an implement, not shown, adapted to be towed by the tractor. The opposite end of the towing shaft 32 is threaded as at 40 with a pair of nuts 42 and 44 threaded upon the end of the shaft as shown in Fig. 1. An H-shaped member 48, shown in Figs. 1 and 5, is apertured to be received over the shaft 32. The upper and lower edges of member 48 are cut away as at 50 and 52 to be received about the edges of the base plate 20 and top plate 24 as shown in Figs. 1 and 5. A nut 56 threaded upon shaft 32 is secured to the forward side of the member 48 as shown in Figs. 1 and 5. A heavy coil spring 58 encircles the pulling shaft 32 and is adapted to bear at one end against member 48 and at the other end against member 28. The coil spring 58 is adapted to spring load the shaft 32 with the nut 56 being adjustable thereupon to increase or decrease the amount of spring tension upon shaft 32.

It is apparent that if the nut 56 is threaded toward the rear end of the shaft 32, the right hand end in Fig. 1, a greater amount of force, or resistance to pull by the implement, may be exerted upon shaft 32 before it will tend to move axially to the right hand side of Fig. 1, or, in other words, toward the rear of the tractor.

In order to prevent rotation of pulling shaft 32, a block 60 is removably secured to the base plate 20 and underlies the flatted end 34 of the shaft. The base plate, block, and shaft are apertured as at 62 to receive therethrough a pin 64, see Fig. 6, provided at one end with a head 66 and at the other end with a nut 68, with the pin being held in position in the aperture 62 by virtue of the head and nut. With the provision of the block 60 and pin 64, the pulling shaft 32 may be locked in place and relative longitudinal movement between the shaft and the plate 20 may be prevented. In other words the shaft 32 may be held stationary such that the load upon the shaft is not carried by the spring 58 but is transmitted directly to the plate 20 and thence to the towbar 14. With the provision of the pin 64 the clutch throwout device is inoperable to disengage the engine from the driving wheels of the tractor. In order to retain the block 60 in position when the actuating mechanism is arranged for clutch disengaging operation, a shorter bolt than the one indicated at 64 may be provided, which extends upwardly through the aperture 62 in the base plate and is threadedly received in the block 60 and terminates just short of the flatted end 34 of the pull shaft. To adjust the tension on compression spring 58, the block 60 is removed and by means of a suitable wrench or the like received over the flatted portion of the pulling shaft, the same may be rotated to threadedly shift the nut 56 and plate 48 longitudinally of the shaft.

Forward of the end wall 26 and at opposite side edges of the plate 20 are mounted a pair of spaced apart bearing supports 72 and 74 through which extends the rocker or lever supporting shaft 76 as shown in Fig. 4. The shaft 76 passes just below the pulling shaft 32. Affixed to the rocker shaft 76 between the bearings 72 and 74 is a yoke member 78. A pin 80 may extend through the yoke and through the rocker shaft 76 to anchor the yoke to the shaft. In the alternative the shaft may be flatted and the pin 80 may be in the form of a set screw or the like which bears against the flatted portion of the shaft. The tines of the yoke 78 lie upon opposite sides of the pull shaft 32 and are disposed between the nuts 42 and 44 such that when the pull shaft 32 is moved the nuts will engage the yoke and rock the same and simultaneously rock the shaft 76. By adjustment of the nuts 42 and 44, the position and amount of movement that the shaft 32 imparts to the shaft 76 may be determined and adjusted. The bearing supports 72 and 74 may be secured to the bottom plate 20 by means of welding or the like indicated at 82.

The opposite ends of the rocker shaft 76 are flatted as at 84 and 86. A lever is mounted on the right hand end of shaft 76 as shown in Fig. 4. The lever is formed of a piece of channel iron 88, the outside of the bottom wall of which abuts the flatted portion 86 of the shaft 76. A flat strip of metal 90 is connected as by the bolts 92 and 94 to the bottom of the channel 88 to grippingly hold the channel against the flatted portion 86 of the shaft 76. In the upper end of the channel and between the side walls thereof is mounted the connector 96 by means of a pivot pin 97 which extends between the side walls of the channel-shaped member 88.

The following described mechanism may be referred to as the connecting linkage of the throwout device. This connecting linkage is shown in one form in Figs. 1–3 with a modification in Fig. 11, and in another form in Figs. 7–8. In Figs. 1–3 and 11 this connecting linkage is adapted to couple the actuating portion 10 of the device, hereinabove described, with the foot clutch mechanism of a well known farm tractor. In Figs. 7–8 the connecting linkage is adapted to couple the actuating mechanism with a hand operated clutch lever as found in another well known farm tractor.

The connecting linkage shown in Figs. 1–3 comprises a pivotally mounted part in the form of a winding drum 98 which is mounted upon the side of the tractor indicated at 100 in Fig. 3. The mounting of the drum upon the tractor is by means of a large bolt or the like 102 which is threaded into the tractor 100, and which extends through a bearing 104 in the drum. The drum may be provided with a pair of annular parallel spaced apart side walls 106 and 108. The side wall 108 is of substantially larger diameter than the wall 106.

A chain or the like 120 is wrapped around the drum 98 and one end is connected to the drum as at 121 and the other end is connected by an adjustable connector 122 to the link rod 124. The other end of the rod is connected to the connector 96. By means of the adjustable connector 122, the tension on the chain 120 and rod 124 may be varied. It is apparent now that upon movement of pulling shaft 32 toward the rear of the tractor, viz: the right hand end of Fig. 1, the lever 88 will be swung clockwise drawing the rod 124 toward the right and revolving the drum 98 while unwinding the chain therefrom.

The conventional foot clutch pedal or clutch arm 128 is mounted upon the tractor at the pivot point 130. The clutch actuating rod 114 is connected to the clutch pedal 128 as at 132, and extends forwardly alongside of the tractor to the clutch lever 134 which is secured as at 136 to a shaft extending into the clutch mechanism of the tractor. The clutch actuating rod 114 is connected to the lever 134 as at 138. The clutch of the tractor is provided with a spring (not shown) which urges the lever 134 counterclockwise and normally maintains the clutch pedal 128 in the position shown in Fig. 1.

Mounted upon the drum 98 near the periphery of the wall 108 is a connector 140. This connector 140 is pivoted as at 141 upon the drum. A connecting shaft 142 is threadedly engaged with the connector 140, and extends forwardly alongside the clutch actuating rod 114. As shown in Fig. 2 the forward end of the shaft 142 is provided with a perpendicular head portion 144 which is apertured as at 146 so that the actuating rod 114 may be received therethrough. The aperture 146 is substantially larger than the rod 114 so that a substantial amount of play between the connecting shaft 142 and the actuating rod 114 is possible. A stop member 152 is received over the rod 114 and adjustably positioned thereupon by means of the set screw 154.

Adjustably mounted upon the connector 140 is an L-shaped stop member 156 provided with a slot 157 through the longer arm thereof, with a locking pin 158 extending through the slot and into the connector, all as shown in Figs. 1 and 10. The shorter arm of the L-shaped stop is adapted to abut the actuating rod 114 as shown in Fig. 9.

In the operation of our clutch throwout device, the nut 56 in the actuating mechanism 10 is adjusted along the pulling shaft 32 to that point at which a determined load may be pulled by the tractor before the shaft 32 will begin to shift longitudinally toward the rear of the tractor. If the implement should strike a large rock, fence, tree, or any other impediment, or if the implement is a cultivator, plow, or the like, and the ground is hard in spots, the load on the shaft 32 may exceed the tension setting of the spring 58 and the shaft will shift toward the rear of the tractor. When this occurs the nut 42 will abut the yoke 78 and thereby rock the shaft 76. The shaft will be rocked clockwise as viewed in Fig. 1, and this will move the upper end of the arm 88 toward the right, and thereby unwind the chain 120 from the drum and cause the drum to rotate in clockwise direction. Such rotation of the drum will cause the connecting shaft 142 to move forwardly and abut the stop 152 and thereby urge the clutch actuating rod 114 forwardly as well.

Forward movement of this rod disengages the clutch of the tractor.

Considering the above described movements of the connecting linkage in view of Fig. 9, the clutch pedal is shown in dotted outline in its normal position at 128a, and in solid outline in the position 128b to which it is moved when our improved device disengages the clutch. The connecting rod is shown in dotted outline at 142a in its normal inoperative position, and in solid outline at 142b in its operative clutch disengaging position. The L-shaped part 156 is shown in positions 156a and 156b and the lever 134 is shown in positions 134a and 134b, corresponding to the positions 142a and 142b and 128a and 128b of the connecting rod and clutch pedal.

When the drum is rotated from a position in which the part 156 is disposed in position 156a to the position 156b, the connecting rod moves from the position 142a to the position 142b. When the rod 142 is in position 142b, the shorter arm of member 156 abuts the clutch actuating rod 114 and prevents further rotation of the drum. When the connecting rod is disposed in position 142b, it will be noted that the point of connection 138 of the clutch actuating rod with the lever 134, the point of connection 141 of the connecting shaft with the drum, and the pivotal axis of the drum at 102, all fall along a substantially straight line. The point of connection 141 of the connecting rod with the drum may lie slightly above a line drawn between the points 102 and 138. In this position the drum may be said to be on dead center or in a locked position. It will remain in this position because the rearward thrust of the springs in the clutch on the actuating rod 114 will prevent the drum from rotating in a counterclockwise direction. While in this position the clutch of the tractor is held disengaged, and will continue to be held disengaged even after the pull on the implement is relieved.

In order to re-engage the clutch, the operator trips the actuating mechanism by pushing counterclockwise upon the foot pedal and urging it to the position indicated at 128c. The stop 152 is then moved away from the head 144 of the connecting shaft, which thereupon permits the drum to rotate counterclockwise by gravity. When the operator then releases the foot clutch pedal the clutch is re-engaged. In urging the foot clutch pedal forwardly from the 128b to the 128c position, the actuating rod 114 drops slightly and urges the L-shaped stop member downwardly thus moving the drum off of its dead center position and imparting to it an initial counterclockwise rotation.

It should be mentioned that sufficient counter-clockwise rotation of the drum to permit re-engagement of the clutch may be obtained, even though there is still a strain on the draft members, by virtue of the adjustment of the nuts 42 and 44 on opposite sides of the yoke. These nuts may be so adjusted relative to the yoke that after a determined strain on the draft members the pull rod will move sufficiently to rotate the drum and disengage the clutch. The tension on the spring 58 is at this point sufficiently great that upon disengagement of the clutch it will urge the tractor rearwardly slightly toward the implement. This rearward movement of the tractor is sufficient to develop a limited amount of slack in the connecting linkage which will permit re-engagement of the clutch when the actuating mechanism is tripped as above described.

It is now apparent that we have provided a clutch throwout device illustrated in Figs. 1–6, 9, and 10, which will automatically disengage the clutch of a tractor when the pull on an implement towed by the tractor exceeds a preset tension in the draft members, and which device may be tripped to re-engage the clutch simply by actuating the manual clutch operating arm or foot pedal.

Fig. 11 shows a modification of the connecting linkage of Fig. 1 and wherein an articulated connecting shaft 149 extends between the drum and the actuating rod 114. The articulated connecting shaft includes an arm 151 rigidly mounted upon the drum 98 to extend radially therefrom, and an arm 153 pivotally connected to the arm 151 by a nut and bolt or similar arrangement 155. A stop member 159 is rigidly secured as by welding to the link arm forwardly of the pivotal connection 155. It will be noted that the pivotally connected ends of the arms overlap one another such that the overlapping end 161 of the arm 151 underlies the stop member 159 and in this fashion the stop member limits the clockwise revolution of the arm 151 and the articulated movement of the connecting shaft.

Means are provided for adjusting the length of the connecting shaft 149. Such means include a pair of nuts 163 and 165 threadedly received over the forward end of the arm 153 upon opposite sides of the link 167. The link 167 is apertured at the top to be slidably received over the actuating rod 114. The link is adapted to abut the adjustable stop 152 and cooperate therewith as above described in connection with part 144 shown in Figs. 1 and 2.

In the operation of the linkage of Fig. 11, when the actuating mechanism 10 tensions chain 120, the drum 98 is rotated clockwise to swing the articulated connecting shaft 149 from the dotted position of misalignment to the solid outline position of substantial alignment, thereby increasing the effective length of the connecting shaft, and urging the clutch actuating rod forwardly to disengage the clutch of the tractor. With the arms 151 and 153 disposed in the solid outline position, the point of connection of link 167 with arm 153 is aligned with the pivot point at 155 and the axis of rotation 102 of the drum, such that the arms or articulated connecting shaft are disposed on what may be termed a dead center position. The rearward thrust on the actuating rod 114 caused by the clutch springs will tend to hold the connecting shaft in such dead center position and thereby prevent reengagement of the clutch. Once the clutch is disengaged, spring 58 in the actuating mechanism backs the tractor slightly relieving the tension on the chain 120. Thereafter, when the operator depresses the clutch pedal 128 to urge the actuating rod 114 farther forward, the tension is taken off the connecting shaft 149 which permits it to break and fall by gravity to the dotted outline position of Fig. 11, which in turn permits the actuating rod 114 to move rearwardly upon release of the clutch pedal to re-engage the clutch.

In Figs. 7–8 the actuating mechanism 10, above described, is shown as mounted upon the drawbar 160 of a well known tractor having a hand operated clutch. A rear wheel of the tractor is indicated at 162 and the transmission as at 164. The frame of the tractor is designated at 166. To this frame may be secured a generally trapezoidal shaped member 168 by means of the bolts or the like 170. A long connecting link 172 is connected to the upper end of the lever 88 of the actuating device. The lever 88 is secured to the rocker shaft 76 as above described. The forward end of the connecting link 172 is adjustably secured by means of a connector 173, as at 174 to the lower end of a pivoted part or lever 176, pivoted as at 178, to the trapezoidal plate 168.

The upper end of the lever 176 is connected by the linkage 180 and 182 to the clutch actuating shaft or rod 184 of the tractor. This rod is connected at its forward end to the clutch lever 186 and at its rear end to the hand lever 188. The hand lever is pivoted to the frame of the tractor as at 190, and the connecting arm 184 is pivotally coupled to the hand lever below this point of connection 190 of the lever with the tractor.

It is now apparent that when the load on the implement drawbar 38 exceeds the pre-set spring tension in the actuating mechanism, the pulling shaft 32 will be drawn toward the rear of the tractor and the lever 88 will be rotated in a counterclockwise direction. When this occurs the link 172 will be drawn rearwardly, drawing with it the lower end of lever 176. The upper end of lever 176 will be pivoted forwardly, drawing with it the linkage 180 and 182 and thereby urging the clutch actuating rod 184 forwardly as well. With the drawing of the rod 184 forwardly, the clutch lever 186 will be moved to a position to disengage the clutch of the tractor. At the same time the hand lever 188 will be pivoted rearwardly.

To engage the tractor clutch it is only necessary to push the hand lever 188 forwardly. This may be done because once the clutch has been disengaged, the compression in heavy coil spring 58 will back the tractor slightly and thereby relieve the tension on the connecting shaft 172 and permit forward movement of the clutch lever.

What we claim is:

1. A clutch throwout device for an agricultural tractor having a clutch and an actuating rod extending longitudinally of the tractor between a clutch pedal and a clutch lever comprising: a pair of relatively movable draft members held under spring tension in a determined relative position with the first of the members to be coupled with an implement to be pulled by the tractor and the other member adapted to be coupled with the tractor, a rotatable part mounted on the tractor and including a winding drum portion, a flexible element operably connected at one end to the first of the draft members and wound at the other end upon the drum portion of the rotatable part and adapted to rotate the part upon being pulled rearwardly by relative movement between the draft members, and means secured to the rotatable part and extending angularly toward and in the direction of movement of the actuating rod and slidably coupled to the rod for determined limited slidable movement thereupon to urge the rod in a direction to disengage the tractor clutch when the part rotates a determined distance in one direction.

2. A clutch throwout device for an agricultural tractor having a clutch and a clutch actuating rod comprising: a pair of relatively movable draft members held under spring tension in determined relative positions with the first of the members adapted to be coupled with an implement to be pulled by the tractor and the other member adapted to be coupled with the tractor, drum means mounted for rotation on the tractor, connecting rod means secured to the drum means and to the clutch actuating rod to shift longitudinally upon rotation of the drum and operable upon rotation of the drum to urge the clutch actuating rod to a position disengaging the clutch, a flexible element having one end wrapped about the drum means, means connecting the other end of the flexible element with the first of the draft members, whereby upon relative movement of the draft members the flexible element is wound off the drum rotating the same and causing the disengagement of the clutch.

3. A clutch throwout device for an agricultural tractor having a spring loaded clutch and a clutch actuating rod operably coupled to the clutch comprising: a pair of relatively movable draft members held under spring tension in determined relative positions with the first of the members adapted to be coupled with an implement to be pulled by the tractor and the other member adapted to be coupled with the tractor; a drum mounted for rotation upon the tractor adjacent the clutch actuating rod, a part mounted on the drum and adapted to abut the clutch actuating rod upon rotation of the drum and limit the rotation thereof; a connecting rod secured to the drum and to the clutch actuating rod; said connecting rod operable upon rotation of the drum to urge the clutch actuating rod against the spring tension of the spring loaded clutch to a position disengaging the clutch with said part abutting the clutch actuating rod and with the point of connection of the connecting rod with the clutch actuating rod and the point of connection of the connecting rod with the drum and the axis of rotation of the drum all lying substantially on a straight line, whereby the drum is held in the aforementioned position by the spring tension of the spring loaded clutch against the clutch actuating rod.

4. A clutch throwout device for a tractor having a clutch and a longitudinally movable clutch actuating rod comprising: a pair of relatively movable draft members held under spring tension in determined relative positions with the first of the members adapted to be coupled with an implement to be pulled by the tractor and the other member connected to the tractor, a drum mounted for rotation on the tractor adjacent the clutch actuating rod, a connecting rod coupled at one end with the drum and slidably coupled with the clutch actuating rod at the other end; a stop member on the actuating rod adapted to limit the slidable movement of the connecting rod and cause movement of the actuating rod with the connecting rod, said drum being rotatable from a position in which said part thereon is spaced from the actuating rod to a position in which the part abuts the actuating rod with the connecting rod being slidable along the actuating rod from said first position of the drum to the second position to urge the actuating rod from a position of clutch engagement to a second position of clutch disengagement.

5. A clutch throwout device for a tractor having a clutch and clutch actuating means comprising: a pair of relatively shiftable spring tensioned draft members with one adapted to be coupled with an implement to be drawn by the tractor and the other coupled to the tractor, connecting linkage operatively coupling the first draft member with said clutch actuating means and including a pair of articulated arms adapted to be mounted on the tractor and responsive to relative shifting of the draft members to swing between positions of longitudinal misalignment and substantial longitudinal alignment to vary the effective length of the connecting linkage and cause disengagement of the tractor clutch.

6. A clutch throwout device for a tractor having a spring tensioned clutch and clutch actuating means comprising: a pair of relatively shiftable spring tensioned draft members with one adapted to be coupled with an implement to be drawn by the tractor and the other coupled to the tractor, connecting linkage operatively coupling the first draft member with said clutch actuating means and including a pair of articulated arms mounted on the tractor and responsive to relative shifting of the draft members to swing from a position of longitudinal misalignment to a position of substantial longitudinal alignment to increase the effective length of the connecting linkage and cause disengagement of the tractor clutch against the spring tension thereof, stop means cooperating with the arms to limit their swingable movement in one direction beyond said position of substantial alignment whereby the spring tension in the clutch acting through the arms will hold them against said stop means and in said position of alignment with the clutch disengaged after the return of the draft members to their original relative positions.

7. A clutch throwout device for a tractor having a spring tensioned clutch and clutch actuating means comprising: a pair of relatively shiftable spring tensioned draft members with one adapted to be coupled with an implement to be drawn by the tractor and the other coupled to the tractor, a pair of articulated arms mounted on the tractor with one of the arms coupled through a lost motion connection with the first draft member and the other arm coupled through a lost motion connection with said clutch actuating means, the first mentioned lost motion connection operable in response to relative shifting of the draft members in one direction to swing said arms from a position of misalignment to a position of substantial alignment while the second mentioned lost motion connection is simultaneously operable to shift said clutch actuating means to a position disengaging the clutch, stop means cooperating with said arms to limit their swingable movement beyond said position of substantial alignment whereby the spring tension of the clutch acting through said clutch actuating means urges the arms against the stop means to hold the arms in said position of substantial alignment with the clutch disengaged after the draft members have returned to their original positions.

8. A clutch throwout device for a tractor having a spring tensioned clutch and clutch actuating means comprising: a pair of relatively shiftable spring tensioned draft members with one adapted to be coupled with an implement to be drawn by the tractor and the other coupled to the tractor, a part adapted to be mounted on the tractor for rotatable movement, an arm rigidly connected to the part, another arm pivotally connected at one end to the free end of the first arm and connected through a lost motion coupling with said clutch actuating means, means connected at one end with the first mentioned draft member and connected at the other end through a lost motion coupling with said part and operable to rotate the part upon shiftable movement of the draft members in one direction, stop means cooperable with said arms to limit their pivotable movement in one direction at a position of substantial longitudinal alignment, whereby upon relative shifting of the draft members in one direction the arms are pivoted to a position of substantial alignment determined by said stop means with the arm coupled to said clutch actuating means urging such means to a position disengaging the clutch against the spring tension of the clutch and with such clutch tension reacting through the arms to lock the same on a dead center position following return of the draft members to their original positions, and the first mentioned lost motion coupling operable upon manual actuation of said clutch actuating means to relieve the tension on said arms and permit them to return to a position of longitudinal misalignment.

9. A clutch throwout device for a tractor having a spring tensioned clutch and clutch actuating means comprising: a pair of relatively shiftable spring tensioned draft members with one adapted to be coupled with an implement to be drawn by the tractor and the other coupled to the tractor, a drum mounted on the tractor for rotation, an arm rigidly connected at one end to the drum and extending radially therefrom, a second arm pivotally connected at one end in overlapping relation with the free end of the first arm and slidably connected at the opposite end with said clutch actuating means, a stop member mounted on one of the arms and adapted to abut the other arm when the arms are disposed in longitudinal alignment and limit further pivotal movement of the arms in one direction, means coupled at one end with the first draft member and having a flexible portion at the opposite end wound around said drum and operable upon relative shifting of the draft members to rotate the drum and pivot the arms from a position of misalignment to a position of substantial alignment, said arms slidably coupled with the clutch actuating means being operable to urge such means to a position disengaging said clutch upon alignment of the arms with the clutch tension reacting through the arms and cooperating with said stop means to hold the arms in substantial alignment, and the slidable connection between the second arm and the clutch actuating means being operable to relieve the clutch tension on the arms upon manual actuation of such means to permit the arms to return to positions of misalignment.

References Cited in the file of this patent

UNITED STATES PATENTS

| | | |
|---|---|---|
| 1,323,634 | Kagay | Dec. 2, 1919 |
| 1,589,060 | Firari | June 15, 1926 |
| 2,129,574 | Gilgenbach | Sept. 6, 1938 |
| 2,284,145 | Hansmann | May 26, 1942 |
| 2,287,516 | Endres | June 23, 1942 |